US010464458B2

(12) United States Patent
Blankenship

(10) Patent No.: US 10,464,458 B2
(45) Date of Patent: Nov. 5, 2019

(54) HEAD SLING AFFIXABLE TO A CHAIR

(71) Applicant: Paula Blankenship, Shepherdsville, KY (US)

(72) Inventor: Paula Blankenship, Shepherdsville, KY (US)

(*) Notice: Subject to any disclaimer, the term of this patent is extended or adjusted under 35 U.S.C. 154(b) by 0 days.

(21) Appl. No.: 15/433,868

(22) Filed: Feb. 15, 2017

(65) Prior Publication Data

US 2017/0232874 A1  Aug. 17, 2017

Related U.S. Application Data

(60) Provisional application No. 62/295,491, filed on Feb. 15, 2016.

(51) Int. Cl.
| | | |
|---|---|---|
| *A47C 7/38* | (2006.01) | |
| *A61F 9/04* | (2006.01) | |
| *B60N 2/882* | (2018.01) | |
| *B64D 11/06* | (2006.01) | |

(52) U.S. Cl.
CPC .............. *B60N 2/882* (2018.02); *A47C 7/383* (2013.01); *B64D 11/062* (2014.12)

(58) Field of Classification Search
CPC ......... A47C 7/383; A47C 7/425; A47C 20/02; B60N 2/882; B60N 2/4879; B60N 2/806; B60N 3/00; B60N 3/004; B60N 2002/905; B60N 2/242; B60N 2/2851; B60N 2/4885; B60N 2/787; B60N 2/888
USPC .................................. 297/391–393, 395, 397
See application file for complete search history.

(56) References Cited

U.S. PATENT DOCUMENTS

| | | | | |
|---|---|---|---|---|
| 2,708,475 | A | * | 5/1955 | Krewson ................ A47C 7/425 |
| | | | | 297/230.13 |
| 3,285,658 | A | | 11/1966 | Cleveland |
| 4,339,151 | A | | 7/1982 | Riggs |
| 4,707,031 | A | | 11/1987 | Meistrell |

(Continued)

FOREIGN PATENT DOCUMENTS

| | | |
|---|---|---|
| CN | 2003239851 U | 2/2003 |
| WO | WO-2009/108823 A1 | 9/2009 |

(Continued)

OTHER PUBLICATIONS

Stewart G. Eidelson, MD, The Effect of Flying on Back and Neck Pain: Survey Results, www.spineuniverse.com, see below https://www.spineuniverse.com/conditions/back-pain/effect-flying-back-neck-pain-survey-results.

(Continued)

*Primary Examiner* — Shin H Kim
(74) *Attorney, Agent, or Firm* — Brian W. Foxworthy; Robert R. Waters; Waters Law Group, PLLC

(57) ABSTRACT

A head support apparatus provides support to a persons head while the person is seated. A seat strap passes around the seat back of a seat and is adjusted tightly enough to maintain itself in position. A support strap attaches in a least one place to the seat strap at the back side of the seat back. The support strap passes up over the top of the seat back and presents a sling at the front side of the seat back to support a user's head. The seat strap, support strap, and sling are adjustable at several locations to place the sling where the user wants it. The sling may be positioned to engage a person's mandible, or forehead, as desired. The sling may also be adjusted to allow the person's head to lay a little to the side.

6 Claims, 10 Drawing Sheets

(56) References Cited

U.S. PATENT DOCUMENTS

| | | | |
|---|---|---|---|
| 5,081,714 A | 1/1992 | Liu | |
| 5,503,456 A * | 4/1996 | Rossini | A47C 7/383 |
| | | | 224/584 |
| 5,544,378 A * | 8/1996 | Chow | A47C 7/383 |
| | | | 297/397 |
| 5,975,638 A * | 11/1999 | Schreiner | A47C 7/383 |
| | | | 297/220 |
| 6,116,691 A * | 9/2000 | Reece | B60N 2/882 |
| | | | 297/392 |
| 6,484,335 B2 * | 11/2002 | Gilbert | A47C 7/383 |
| | | | 297/397 |
| 6,607,245 B1 | 8/2003 | Scher | |
| 6,782,572 B1 * | 8/2004 | Jones | A47C 7/383 |
| | | | 297/397 |
| 6,805,403 B2 * | 10/2004 | Buch | B60N 3/00 |
| | | | 297/146 |
| 7,740,318 B2 * | 6/2010 | Funke, III | A47C 7/383 |
| | | | 297/393 |
| 7,832,802 B2 | 11/2010 | Ehlers | |
| 7,909,406 B2 | 3/2011 | Samuelson | |
| D694,309 S | 11/2013 | Shellady | |
| 8,662,590 B2 | 3/2014 | Bogen | |
| 8,708,416 B2 * | 4/2014 | Stronconi | A47C 20/02 |
| | | | 297/397 |
| D728,807 S | 5/2015 | Hansen | |
| 9,186,276 B2 | 11/2015 | Parziale | |
| 9,364,369 B2 | 6/2016 | Van Stone | |
| 9,751,438 B2 * | 9/2017 | Dunham | B60N 2/882 |
| 2001/0002087 A1 | 5/2001 | Townsend | |
| 2004/0124685 A1 * | 7/2004 | Buch | B60N 3/00 |
| | | | 297/393 |
| 2007/0124862 A1 | 6/2007 | Beyda | |
| 2008/0269544 A1 | 10/2008 | Atkin et al. | |
| 2011/0031799 A1 | 2/2011 | DeJoode | |
| 2011/0043025 A1 | 2/2011 | Park | |
| 2013/0020853 A1 | 1/2013 | Gibson | |
| 2013/0119716 A1 * | 5/2013 | Stronconi | A47C 20/02 |
| | | | 297/180.1 |
| 2014/0371030 A1 | 12/2014 | Kivinen | |
| 2015/0061340 A1 | 3/2015 | Fleming | |
| 2015/0151070 A1 | 6/2015 | Capra et al. | |
| 2015/0203009 A1 | 7/2015 | Swearingen | |
| 2016/0297336 A1 | 10/2016 | Suomi | |

FOREIGN PATENT DOCUMENTS

| | | |
|---|---|---|
| WO | WO-2010/129652 A1 | 11/2010 |
| WO | WO-2013/154411 A1 | 10/2013 |
| WO | WO-2016/151578 A2 | 9/2016 |

OTHER PUBLICATIONS

L. Matthews, Neck Pain After Sleeping, www.painneck.com, http://www.painneck.com/blog/neck-pain-sleeping/.

* cited by examiner

HEAD SLING AFFIXABLE TO A CHAIR

CROSS REFERENCE TO RELATED APPLICATIONS

This application is a utility application which claims priority to U.S. Provisional Application 62/295,491, filed on Feb. 15, 2016. The entire disclosures contained in the specification and figures for U.S. Provisional Application 62/295,491, including the attachments thereto, are incorporated herein by reference.

FIELD OF THE INVENTION

The present application relates generally to kits in the fields of garments, headrests, and particularly to head supports, that fit onto car and airplane seats to provide stability from undesired side to side and forward movement of a wearer's head.

BACKGROUND OF THE INVENTION

Long distances commutes via land, sea, and air have become commonplace for both business and pleasure. During those commutes, the passenger spends most of their time seated, sometimes in a partially reclined position. As a result, passengers often fall asleep in their seats out of the boredom of being confined to their seat or due to fatigue from rising early or working late.

In 2008, a survey was conducted to gather data on how airplane seats affect travelers' backs and necks. The hypothesis that a majority of air passengers, even those that stay awake during flight, develop back and/or neck pain after a flight was confirmed by the survey. The results of that survey, depicted graphically in FIGS. 1-4, demonstrate that 69% of all air travelers developed neck pain after their flight, 74% of air travelers indicated that they would be willing to pay extra to be able to have a special seat that would help alleviate back/neck pain from travel, and that as many as 25% of respondents would be willing to pay at least $51 for a more comfortable travel experience.

It is common knowledge the neck and upper back muscles will relax when a person enters active or REM (rapid eye movement) sleep. When that person falls asleep in an upright or slightly inclined position the head loses its support and will fall away from its vertical axis. When the head is resting against a head rest and the person falls asleep, the head may fall forward, roll to the left side or the right side, or fall forward and roll to one side, all of which negate the natural alignment of the spine. The movement of the head may become more frequent and forceful in turbulent travel conditions. Moreover, the head may jerk to compensate for an unsafe imbalance of mass away from the vertical axis. Due to sudden movement, vertebra in your neck can misalign, this in turn presses on nerves that in turn can cause neck muscle spasms. Since the average person's head weighs 5 to 6 kg (approximately 12 to 14 lbs), the head is designed to distribute weight evenly from front to back and side to side so as to not cause unnecessary strain on ligaments, tendons, and muscles.

Complaints of tension, neck pain, headache, and fatigue are common after waking from sleep where the person's head is in movement or comes to rest in an unnatural position. The position of the head while sleeping may affect circulation and constrict the airway in those prone to sleep apnea. Waking with neck pain after sleeping can mean that it is painful to turn your head, that the neck is stiff and perhaps even that your posture has changed slightly. Where the neck is tilted to one side this is referred to as acquired torticollis (wry neck). Adult acquired torticollis is usually able to be treated conservatively, however, as the cause is an acute problem with the musculoskeletal system. Basically, any time the neck is held in a poor posture position, the muscles become stressed and they can become fatigued.

Those who regularly suffer from torticollis and neck pain after sleeping may wish to consult their doctor and/or chiropractor to see if there is an underlying spine condition at work. Facet joint disease, disc bulging or herniation, cervical spine arthritis, or other mechanical problems could be at the root of the pain and could be exacerbated by awkward head positions or movement while sleeping. Where there is a stability problem in the spine, the muscles and ligaments often overcompensate by becoming tense, stiff and calcified, and new bone may even develop as bone spurs to try to restore stability in frequent travelers. Swelling and inflammation in the neck can also arise as a way of restricting damaging movements through hyper-flexibility. Using anti-inflammatories and pain relief medications may help in the short term in such cases but the problem will likely persist unless the underlying cause is dealt with effectively. The above issues and many other issues may be found discussed in non-patent literature regarding neck health and neck health while traveling.

RELEVANT ART

U.S. Published Patent Application 2015/0203009 A1 by Swearingen is for a "HEAD STABILIZING STRAP ASSEMBLY". Embodiments of the apparatus include a system for holding a user's head upright and in place, the system including a seat strap, a chin strap, and a forehead strap. The seat strap may be configured to fit around the circumference of a seat's headrest. The chin strap may be padded and have a central portion, a distal end, and a proximal end. The distal end and the proximal end may be spaced apart and removably attached to the seat strap by a fastener. The chin strap may be adjustable and configured to fit around a user's chin. The forehead strap may be attached to the seat strap between the proximal end of the chin strap and the distal end of the seat strap. The forehead strap may be adjustable and configured to fit around a circumference of the user's forehead.

U.S. Pat. No. 6,607,245 B1 by Scher is for a "HEAD RESTRAINT". Scher discloses a head restraint for supporting a user's head with respect to the head rest portion of a seat. The head restraint has a headband strap for placing over the head across the forehead of the user. An anchor band is secured around the head rest portion of the seat. A righthand securement strap is affixed between the strap placed over the head of the user and the anchor band. Similarly, a lefthand strap is affixed between the strap placed over the head of the user and the anchor band.

U.S. Pat. No. 7,909,406 B2 by Samuelsen is for a "RESTING APPARATUS". Samuelsen discloses a resting apparatus that includes a resting platform sufficient to support the leaning weight of the user and a configuration of straps to provide support in a limited or enclosed space. The resting platform has a pair of support loop straps extending from it. These support loop straps fasten to a suspension strap that loops around the seat back. Embodiments of the resting apparatus has some adjustable features.

U.S. Pat. No. 3,285,658 B2 by Cleveland is for a "HEAD SUPPORT DEVICE". In Cleveland a pair of straps attach to a seat back. Cleveland suggests using safety pins in some applications and in other, more permanent, applications, snaps attached to the seat back to attach the straps. A cross brace extends between the straps to maintain their spacing. The straps join to opposite ends of a pad which hangs down in the front of a seat. This pad supports the head of a person occupying the seat.

As may be seen from the relevant art, there is a need for a support apparatus that is easily adjustable to different seats and different positions, and uses the full height of the seat back.

SUMMARY

The embodiments of the device described herein comfortably maintains the position of the wearer's head while sleeping in an upright position, such as on an airplane, bus, train, etc. The device provides a sling, preferably formed of a foam material or memory foam, which supports a user's head by contacting a user's mandible or keeps a user's head vertical aligned by contacting a user's forehead. The sling has a distal surface which is adjacent to the mandible or forehead of the user and a proximal surface which faces away from the user. Ideally, the distal surface is soft and comfortable to the user. The proximal surface, in an embodiment, is durable and capable of acting as the outer shell of a pouch in which the device is self-contained.

In some arrangements, the user's mandible rests in the sling against a distal surface which faces the user. This provides support that prevents the forward movement of the head, and the side-to-side movement of the head as well. The tension across the sling is sufficient to prevent dramatic and sudden movements of the head, but does not provide so much force as to be uncomfortable to the user while seated and awake, permitting normal head movement such as turning and moving the chin down and up with eating or with reasonable forward and back head movements. In some arrangements, the sling may be adjusted to allow the head to lay to the side and be supported. For some users, or for long trips, a strictly vertical position may be uncomfortable. Alternatively, the device may be adjusted to contact a user's forehead to maintain the head in an upright and neutral position.

The sling is affixed to straps which form a first loop adjacent to the sling and a second loop adjacent to the first loop. Alternatively, drawstrings are utilized instead of straps. The drawstrings are pulled tight and held in place by drawstring fasteners.

The first loop is affixed to the lengthwise ends of the sling at a first end and a second end, with the ends being situated at the lengthwise ends of the sling which, when worn, extend distally upward from the mandible. The first loop is formed by a proximal side consisting of the sling and a distal side adjacent to or integrated with the proximal side of the second loop. The second loop extends distally away from the distal side of the first loop and possesses a proximal side adjacent to or integrated with the first loop's distal side. The proximal side of the second loop encircles the chair back.

The first loop is preferably smaller than the second loop, with the second loop having a means to adjust the circumference of the loop so as to securely fit around a chair back. The second loop of the device is placed over the chair back with the proximal end of the second loop arranged across the distal side of the chair back, opposite of the proximal side where a person would sit and rest their back. The second loop is then tightened by the means to adjust the circumference of the loop so as to fit securely around the chair back.

The first loop and sling are pulled up and over the headrest so that the first loop is arranged across the headrest and arranged so that the distal side of the first loop lies on the distal side of the chair back and the sling lies on the proximal side of the chair back while the lateral sides if the first loop drape over the headrest. When utilized with a seat, the wearer's mandible is placed in the sling for support. The lateral ends of the sling extend upward from the mandible so as to provide lateral and rotational stability to the head. By using the full height of the seat back, embodiments of the device allow the first loop to remain closer to vertical as it extends upward from the sling.

Alternatively, the head support is comprised of a sling possessing a drawstring extending from the first and second sides of the sling and through a plurality of drawstring fasteners through which two loops are created. The drawstring may comprise a drawstring loop which is a continuous conjoined drawstring along which a plurality of drawstring affixing means are utilized to securely bring a first drawstring side and a second drawstring side together so as to create at least two loops; two separate drawstrings which originate from each side of the sling and which run parallel to each other so as to create a plurality of loops, the first of which encompasses the chair back. The first drawstring fastener is arranged so as to create a first loop by pulling the two sides together so as to affix and secure the headsling around the chair back. The first drawstring fastening means is configured to tighten the drawstring about the chair back. The first drawstring fastening means is intended to tighten against and stop adjacent to the proximal side of the chair back, i.e. the seating surface.

A second loop is formed between the distal side of the chair back and the sling. The length of the second loop is adjustable to accommodate different length requirements. The distal end of the second loop is integrated with the sling. The sling and second loop passes over the head rest of the chair for engagement with the wearer's chin drawstring fastener.

When not being used, the sling acts as a pouch to store the straps or drawstrings which comprise the first loop and second loop. In one embodiment, the sling is deployed by inverting the pouch to reveal the soft, distal side of the sling. The sling possess a means for fastening so as to seal the pouch with the straps inside. In an embodiment, the first loop is affixed to the sling so that the point of affixation will lie within the pouch formed when the sling is inverted and sealed. In a further embodiment, the straps or drawstrings used in the first loop are elastic to accommodate the comfort of the wearer.

In other embodiments of the device, the sling has spring powered reels at each end. The spring power reels carry within them straps, which have clips at their ends. The straps may be made of cord, cable, or any suitable tensile material. After a loop is placed around the seat back and adjusted to be sufficiently snug to maintain its position on the seat. The straps are extended from spring powered reels and the respective clips attached to the loop. The straps pass up over the top of the seat back and present the sling at the front side of the seat back. The spring powered reels can be locked maintain the straps at a set length, or the spring powered reels may be allowed to keep tension in the straps. In some embodiments, the spring powered reels are enclosed in the ends of the sling and the straps exit the ends of the sling. Buttons on the spring powered reels are accessible through the sling to lock or unlock the spring powered reels.

Also disclosed herein is a collapsible garment which expands to form a cocoon in which a person may relax while in a seated position. The cocoon acts as a blanket within which a traveler may seek comfort and refuge while sitting on an airplane, train, bus, or similar means of transportation. The garment is preferably comprised of a thin material such as a synthetic material like nylon or vinyl, but may also be comprised of natural fabrics such as cotton. Ideally, the garment will be soft, and be capable of retaining a traveler's body's heat so as to create a comfort zone in which the wearer resides.

The garment possesses an internal surface and an external surface, a front, left and right sides, a neck covering which transitions from the chest and back into a hood to cover the wearer's head, tube-like arm coverings, and at least one leg pouch, but alternatively two leg pouches, in which the wearer's legs are inserted. In an alternative embodiment, the garment is lined on the internal surface. The liner is intended to enhance the comfort of the wearer. The liner is preferably intended to enhance softness but may also increase warmth in a further alternative embodiment.

The garment possesses an open back through which the wearer may enter the cocoon while seated, preferably feet first. The garment's open back preferably transitions to a closed back across the shoulders and legs. The wearer then inserts their arms into the arm coverings. The arm coverings are tube-like and enclose the length of the wearer's arms when inserted therein from the back of the garment. The arm coverings possess proximal and distal ends. The distal ends of the arm coverings are preferably configured with elastic so as to enclose the wearer's arms.

In an embodiment, a pouch is integrated into the outer surface of the garment's chest to provide for storage. Preferably, the pouch is utilized to enclose the garment when collapsed. When collapsed, the garment can be rolled up and folded so as to facilitate its entry into the pouch for storage.

When combined with a headsling, it forms a traveler's comfort kit which is employed by a traveler for the purpose of finding comfort while traveling. The kit may be entirely contained within a single pouch or alternatively within separate pouches. The pouch is sealed by a pull drawstring fastener to keep the pouch closed.

BRIEF DESCRIPTION OF THE DRAWINGS

Additional utility and features of the invention will become more fully apparent to those skilled in the art by reference to the following drawings, which illustrate some of the primary features of embodiments of the head support apparatus.

DETAILED DESCRIPTION OF EMBODIMENTS

Figure 5:
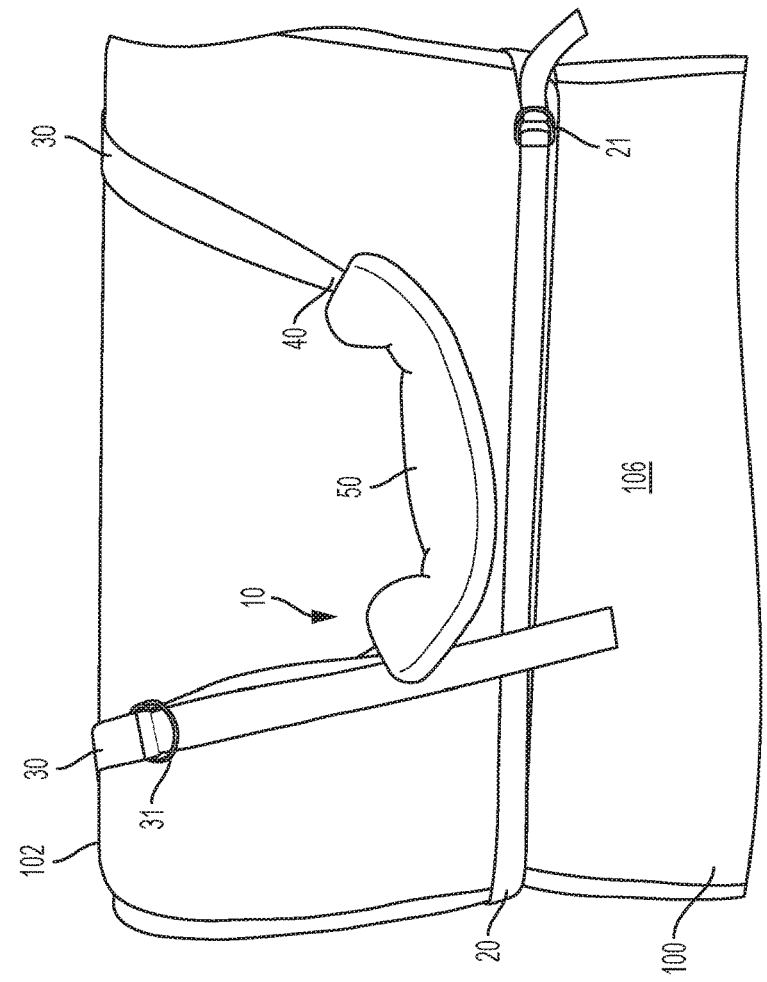
FIG. 5 shows a front view of a seat back with an embodiment of a head support installed on it.

FIG. 5 shows a front view of a seat back 100 with an embodiment of head support 10 installed on it. Seat strap 20 of head support 10 passes around seat back 100. Seat strap 20 is sized to be snug enough to maintain its desired location on seat back 100. D-rings 21 allow seat strap 20 to be sized as needed. Support straps 30 pass over the top 102 of seat back 100 and present sling 40 at the front side 104 of seat back 100. In the embodiment of FIG. 5, sling 40 is contiguous with support straps 30 and may be a section of a strap, or multiple straps combined. The strap may run from a first end to a second end, each end attached to seat strap 20 at the back side 106 of seat back 100. D-rings 31 allow the length of the strap to be adjusted and may operate to combine multiple straps. In FIG. 5, pad 50 is located on sling 40, and its location on sling 40 is adjustable.

Figure 1:
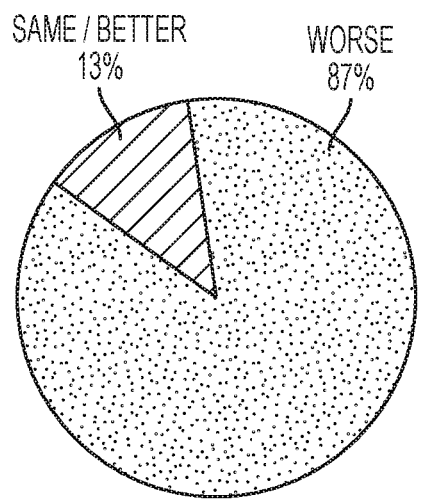
FIG. 1 is a pie graph of responses to the survey question, "How did your back/neck feel after the flight?"
Figure 2:
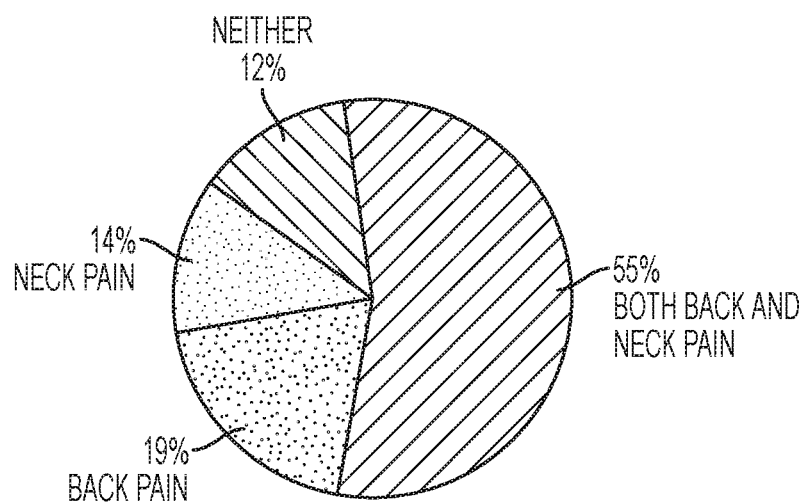
FIG. 2 is a pie graph of responses to the survey question, "What type of pain did you have after a typical flight."
Figure 3:
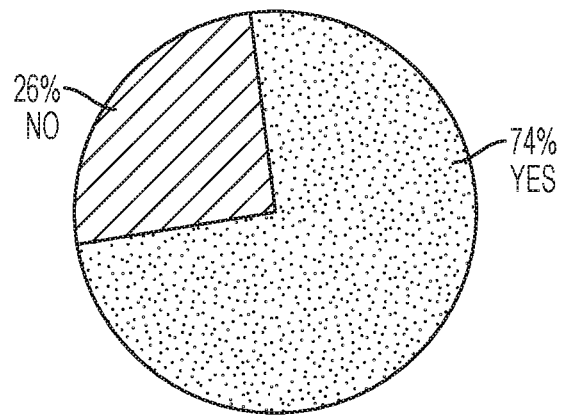
FIG. 3 is a pie graph of responses to the survey question, "Would you be willing to pay extra if airlines offered a special seat for back/neck pain sufferers?"
Figure 4:
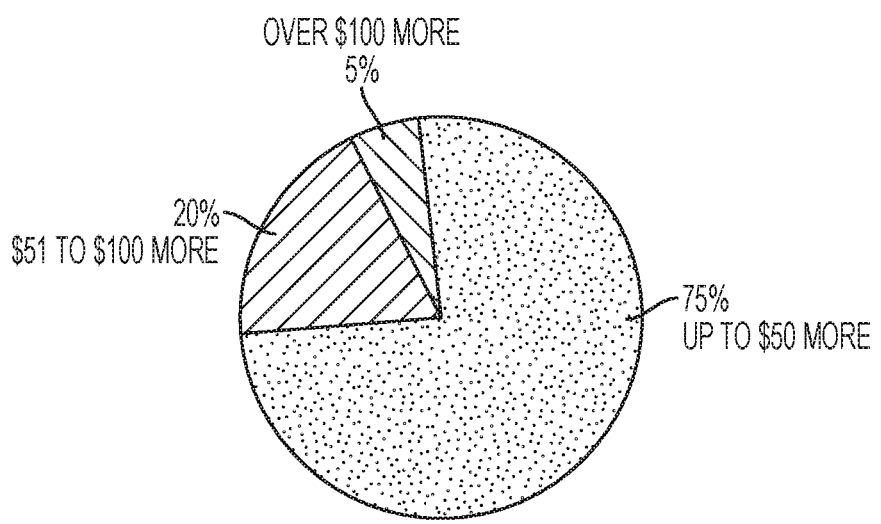
FIG. 4 is a pie graph of responses to the survey question, "How much will you be willing to pay?"
Figure 6:
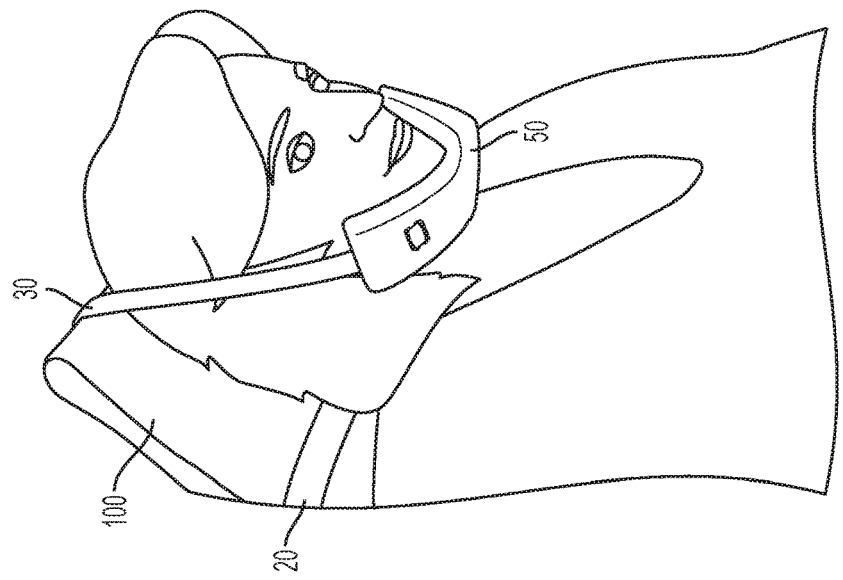
FIG. 6 is a perspective view of an embodiment of a head support installed on a seat back and a person using the apparatus.

FIG. 6 is a perspective view of an embodiment of a head support 10 installed on seat back 100 and a person using the apparatus 10. Seat strap 20 of head support 10 passes around seat back 100 and is adjusted tight enough to maintain itself in position on seat back 100. A section of support strap 30 passes over the top 102 of seat back 100 to present sling 40 at the front side 104 of seat back 100. Pad 50 of sling 40 provides greater comfort, especially for embodiments having a narrower support strap. In FIG. 6, support strap 10 is arranged to present sling 40 centered with the person and at height to engage the person's mandible.

Figure 7:
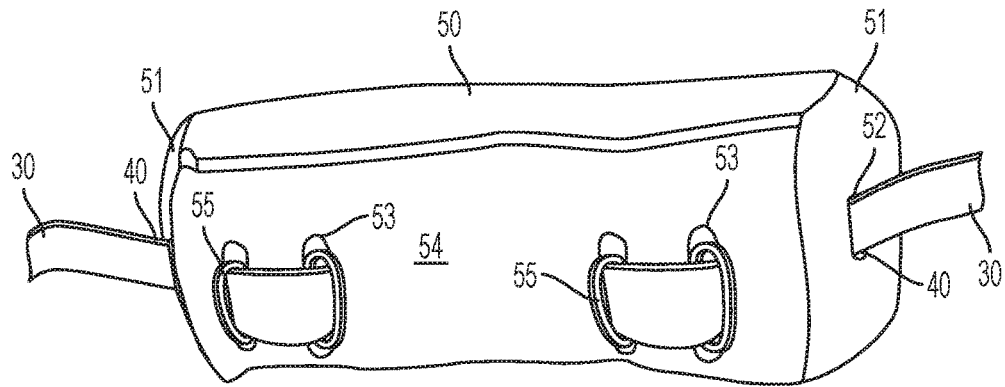
FIG. 7 shows a pad slidable along a support strap.

FIG. 7 shows pad 50 slidable along support strap 30. Pad 50 has end apertures 52 at each end 51 and buckle apertures 53 on its bottom 54. Buckles 55 are located at buckle apertures 53. Pad 50 receives support strap 30 through end apertures 52. Support strap 30 passes into one end of pad 50 and through buckles 55 and out the opposite end. Buckles 55 provide adjustment points for pad 50 while maintaining pad 50 in position on support strap 30 once adjustment is made.

Figure 8:
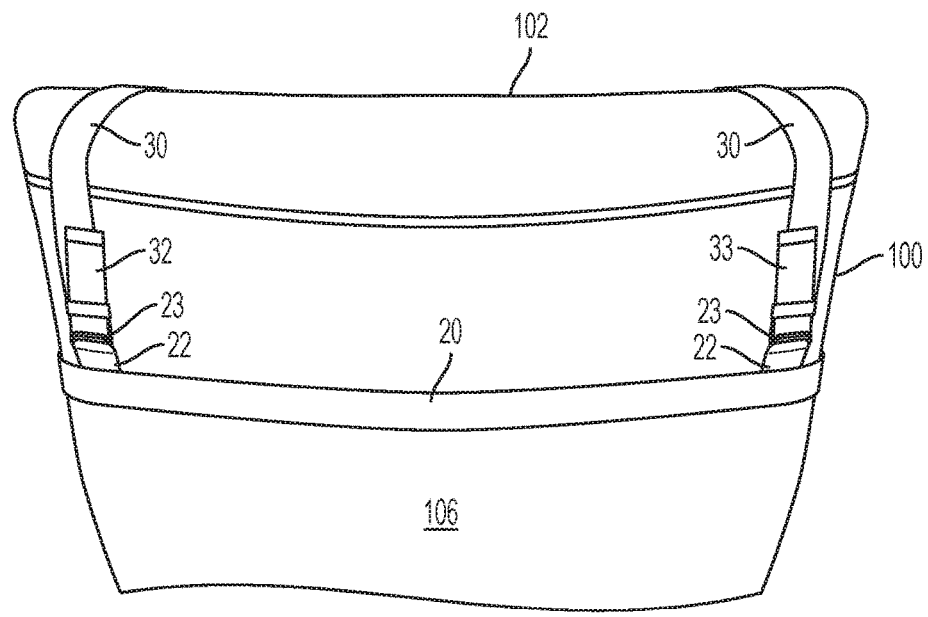
FIG. 8 shows the back of a seat having an embodiment of a head support installed on it.

FIG. 8 shows the back side 106 of a seat back 100 having an embodiment of a head support 10 installed on it. Seat strap 20 runs across the back side 106 of seat back 100. A first end 32 of support strap 30 attaches to seat strap 20, and support strap 30 runs from there up and over the top 102 of seat back 100. A second end 33 of support strap 30 attaches to seat strap 20, and support strap 30 runs from there up and over the top 102 of seat back 100.

Figure 9:
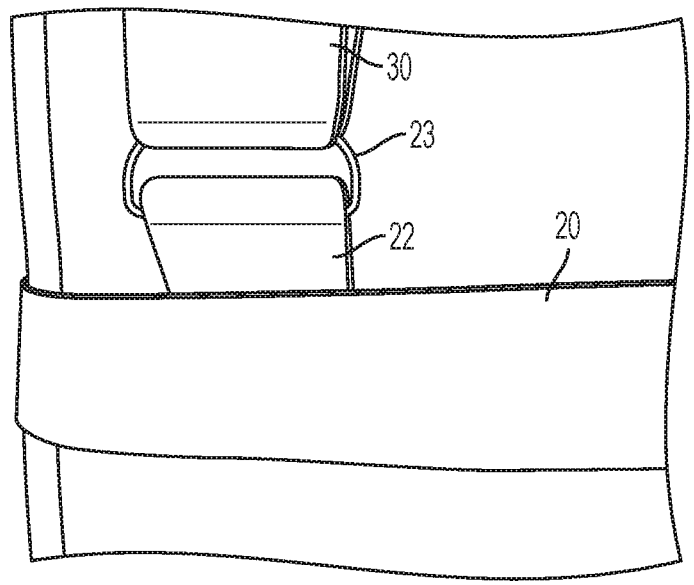
FIG. 9 shows the back of a seat with an embodiment of a head support installed on a seat back where the end of a support strap attaches to a seat strap.

FIG. 9 shows the back side 106 of a seat back 100 with an embodiment of a head support 10 installed on the seat back where an end of a support strap 30 attaches to a seat strap 20. Buckle loop 22 attaches buckle 23 to seat strap 20. First end 32 of support strap 30 passes through buckle 23. Buckle 23 provides a point of adjustment for support strap 30.

Figure 10:
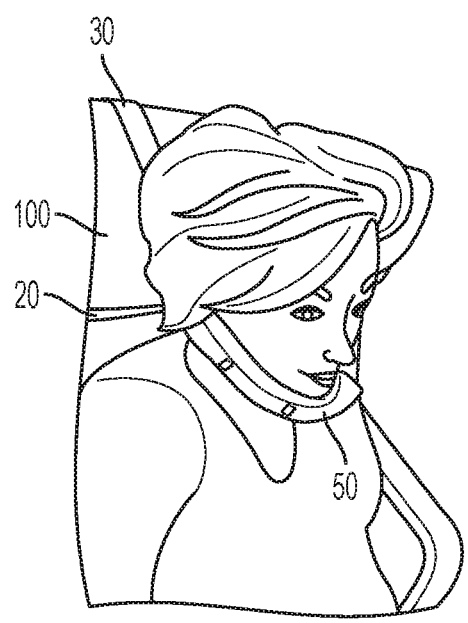
FIG. 10 shows an embodiment of a head support installed on a seat and a person using the apparatus adjusted to allow the head to lay to the side.

FIG. 10 shows an embodiment of head support 10 installed on a seat back 100 and a person using the apparatus adjusted to allow the head to lay to the side. In FIG. 6, support strap 10 is arranged to present sling 40 centered with the person and the persons head is held in a generally vertical alignment. However, over longer periods of time, a person may want to change positions. Staying in one position for an extended period of time may become uncomfortable. Alternatively, for individual persons, vertical alignment may not be the best position. Support strap 30 passes over the top 102 of seat back 100, using the full height of seat back 100. This, along with the several locations where support strap 30 can be adjusted, and the ability to slide pad 18 along sling 40, allows the head to be supported while having a sideward tilt.

Figure 11:
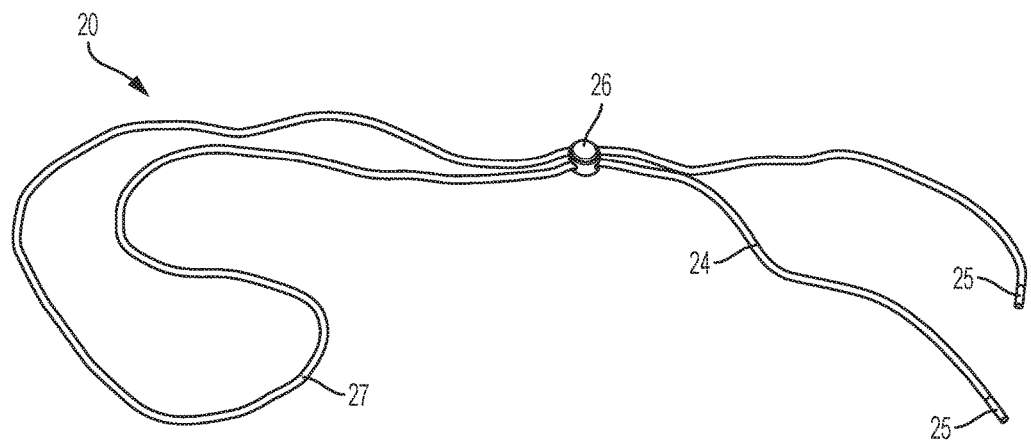
FIG. 11 shows an embodiment of a seat strap by itself.

FIG. 11 shows an embodiment of a seat strap 20 by itself. In this embodiment, seat strap 20 can be essentially separate from sling 40 and support strap 30 of head support 10, and may even be stored in sling 40 of head support 10. In FIG. 11, seat strap 20 is a single linear cord 24 with both ends 25 of cord 24 being inserted through spring loaded cord lock 26 to form a loop 27. The loop 27 of seat strap 20 can be adjusted to fit a seat back by squeezing cord lock 26 to open it and then pulling either end 25 or both ends 25 of cord 24 through cord lock 26. In this way, loop 27 can be adjusted to fit a seat back tightly enough to maintain its location on the seat back.

Figure 12:
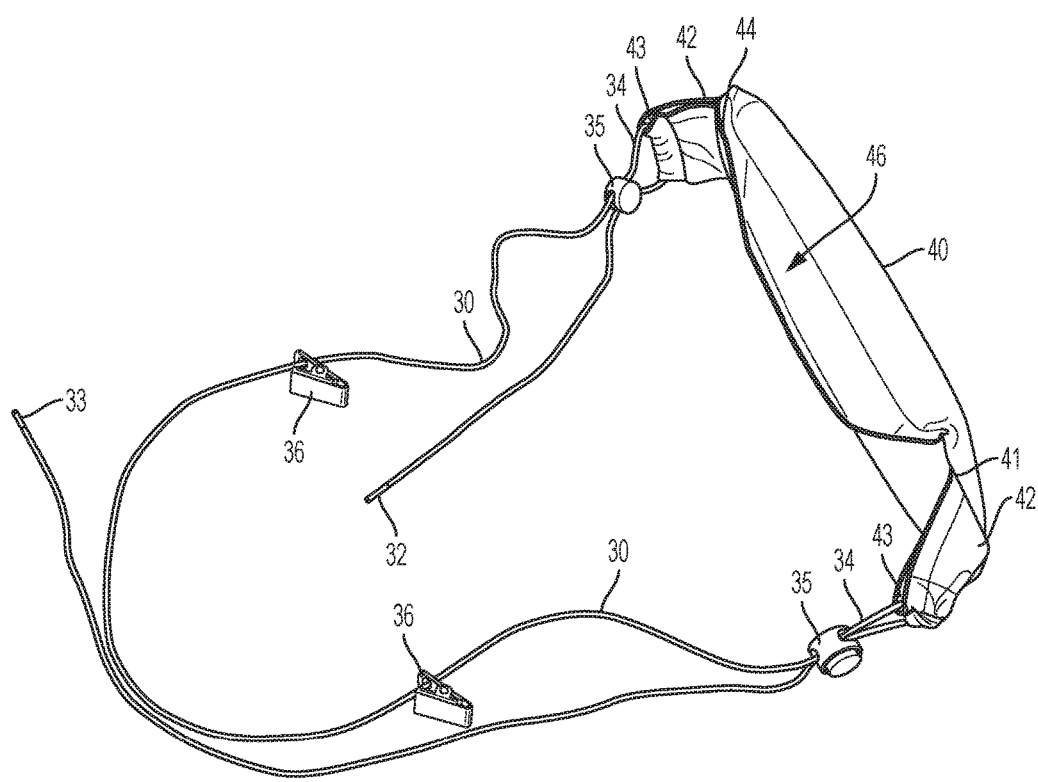
FIG. 12 shows an embodiment of a sling portion and support strap of a head support.

FIG. 12 shows an embodiment of a sling portion 40 and support straps 30 of a head support. Sling 40 has appendages 42 at each of its ends 41. Support straps 30 attach to appendages 42 on the ends 41 of sling 40. In the embodiment of FIG. 12, appendages 42 have apertures 43 through which the ends 32, 33 of support strap 30 are inserted. Adjustable loops 34 are formed at each end 32, 33 of support strap 30 by further passing ends 32, 33 through spring loaded cord locks 35 proximal to each end of support strap 30. In all, support strap 30 passes through a cord lock 35, an aperture 43 in an appendage 42 on sling 40, and back through a respective cord lock 35 to form adjustable loop 34. Cord locks 35 can be manually released to adjust the length of support strap 30 extending between apertures 43 of sling 40.

Still referring to FIG. 12, clips 36 have an aperture through which support strap 30 passes. Clips 36 attach support strap 30 to seat strap 20 at the back side 106 of seat back 100. From clips 36 support strap 30 extends over the top 102 of seat back 100. Clips 36 can be moved along support strap 30 to different positions to change the specific height of sling 40 and the relative height of ends 41 of sling 40 when it is installed on a seat back 100.

In FIG. 12, pouch 46 is partially open. Seat strap 20 is stored in pouch 46 when head support 10 is not installed on a seat back. Pouch 46 is sealable by hook and loop material, but could be sealable by any preferred method, such as a zipper, snaps, buttons, clasps, or hooks.

Figure 13:
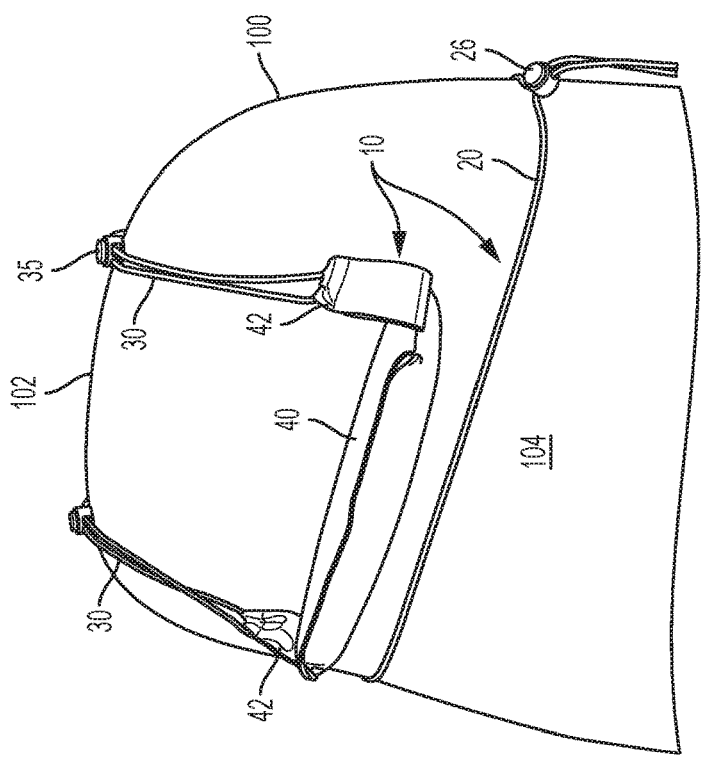
FIG. 13 is a front perspective view of an embodiment of a head support installed on a seat back.

FIG. 13 is a front perspective view of an embodiment of a head support 10 installed on a seat back 100. Seat strap 20 passes around seat back 100 and is adjusted and sized to maintain its position by cord lock 26. Sling 40 is suspended from support strap 30 at appendages 42 at ends 41. Support strap 30 pass up over the top 102 of seat back 100. On the back side 106 of seat back 100, support strap 30 attaches to seat strap 20.

Figure 14:
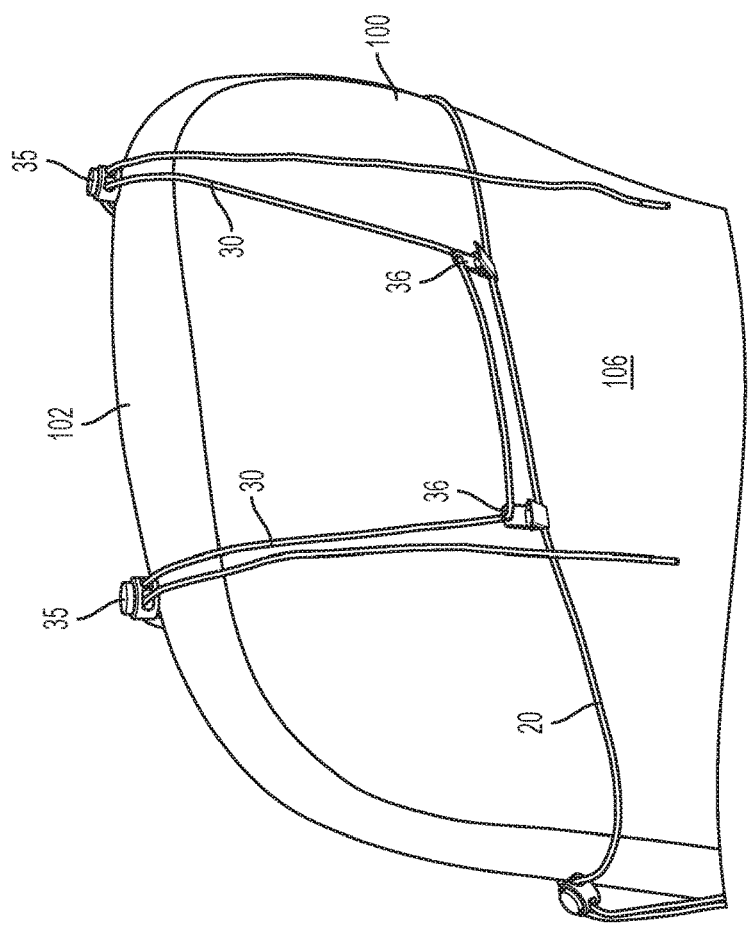
FIG. 14 is a rear perspective view of an embodiment of a head support installed on a seat back.

FIG. 14 is a rear perspective view of an embodiment of head support 10 installed on a seat back 100. Support strap 30 comes down from the top 102 of seat back 100 and clips 36 attach support strap 30 to seat strap 20. In FIG. 14, some slack may be seen in support strap 30 between clips 36. Adjusting the locations of clips 36 on seat strap 20 effects the spacing and locations of where support strap 30 passes over the top 102 of seat back 100. This can be used to alter where sling 40 is positioned in relation to the center of seat back 100 and can allow a person's head to lay a little to the side. By passing over the top 102 of seat back 100, support strap 30 make use of the full height of seat back 100, allowing a greater range of positions for a person using head support 10.

Figure 15:
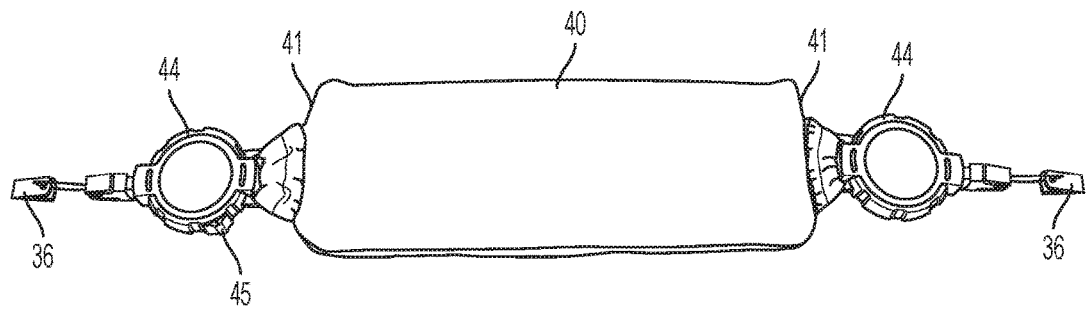
FIG. 15 shows an embodiment of a sling portion of a head support, the sling portion having spring powered reels containing support straps.

FIG. 15 shows an embodiment of a sling portion 40 of a head support 10. In the embodiment of FIG. 15, appendages 42 at ends 41 of sling 40 are spring powered reels 44 which contain support straps 30. Clips 36 are attached to the ends 32 of support straps 30. In FIG. 15, support straps 30 are fully retracted within spring powered reels 44. Button 45 is moved to lock and unlock spring powered reel 44. In some embodiments, button 45 defaults to locking spring powered reel 44 and is pressed, or moved, to unlock spring powered reel 44. The length of support strap 30 is then adjusted to the desired length. Button 45 is released to lock spring powered reel 44 and maintain the length of support strap 30. In other embodiments, button 45 defaults to an unlocked configuration. In those embodiments, support straps 30 are adjusted and then button 45 is moved to lock spring powered reel 45 to hold the adjusted length of support straps 30.

Figure 16:
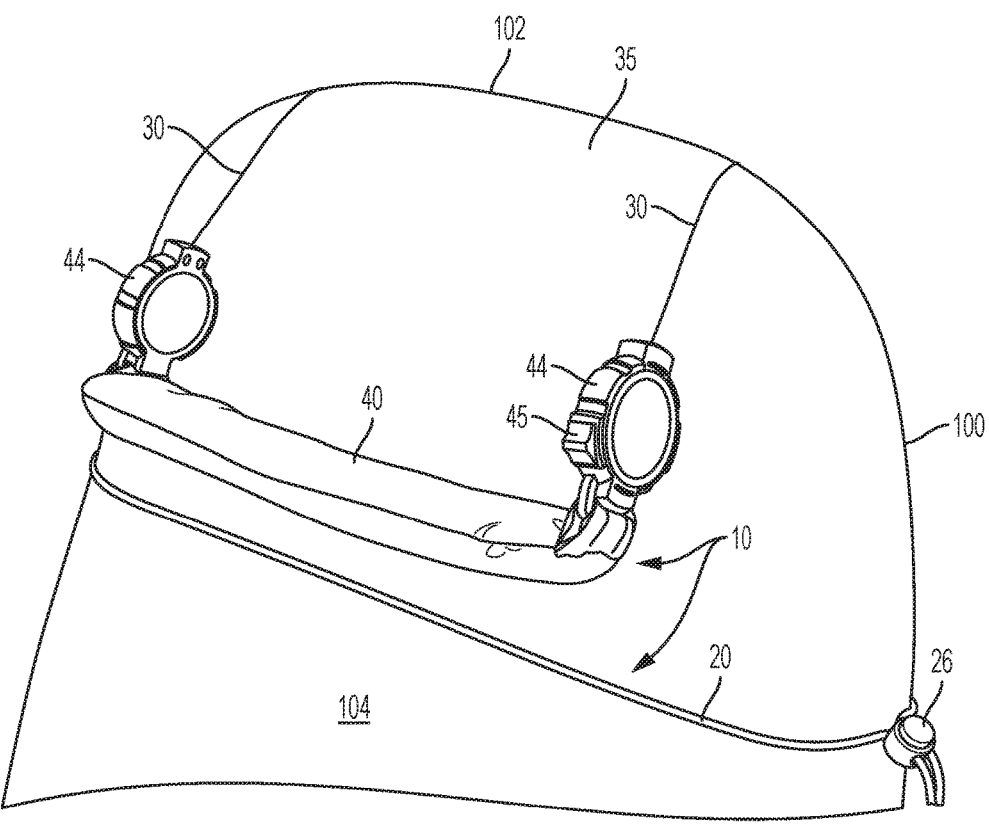
FIG. 16 is a front perspective view of an embodiment of a head support installed on a seat back.

FIG. 16 is a front perspective view of an embodiment of a head support 10 installed on a seat back 100. Seat strap 20 passes around seat back 100 and is adjusted and sized to maintain its position by cord lock 26. Sling 40 is presented at the front side 104 of seat back 100. Support straps 30 extend from spring powered reels 44 at ends 41 of sling 40. Support straps 30 pass up over the top 102 of seat back 100. On the back side 106 of seat back 100, support straps 30 attached to seat strap 20.

Figure 17:
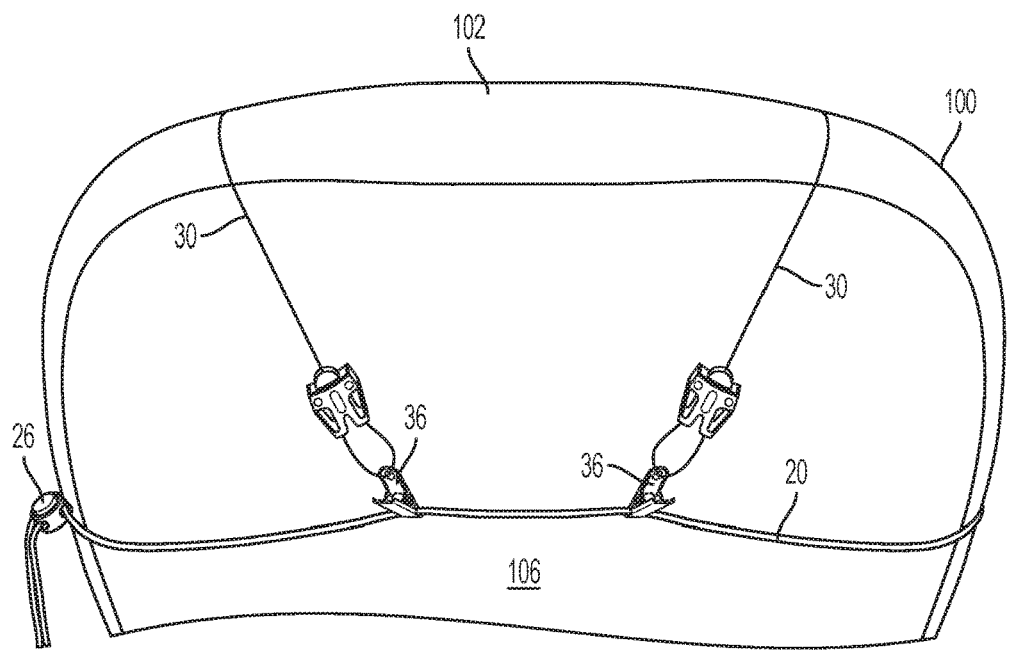
FIG. 17 is a rear perspective view of an embodiment of a head support installed on a seat back.

FIG. 17 is a rear perspective view of an embodiment of a head support installed on a seat back. Support straps 30 come down from the top 102 of seat back 100 and clips 36 attach support straps 30 to seat strap 20. Adjusting the locations of clips 36 on seat strap 20 effects the spacing and locations of where support straps 30 passes over the top 102 of seat back 100. This can be used to alter where sling 40 is positioned in relation to the center of seat back 100 and can allow a person's head to lay a little to the side. By passing over the top 102 of seat back 100, support strap 30 make use of the full height of seat back 100, allowing a greater range of positions for a person using head support 10.

Figure 18:
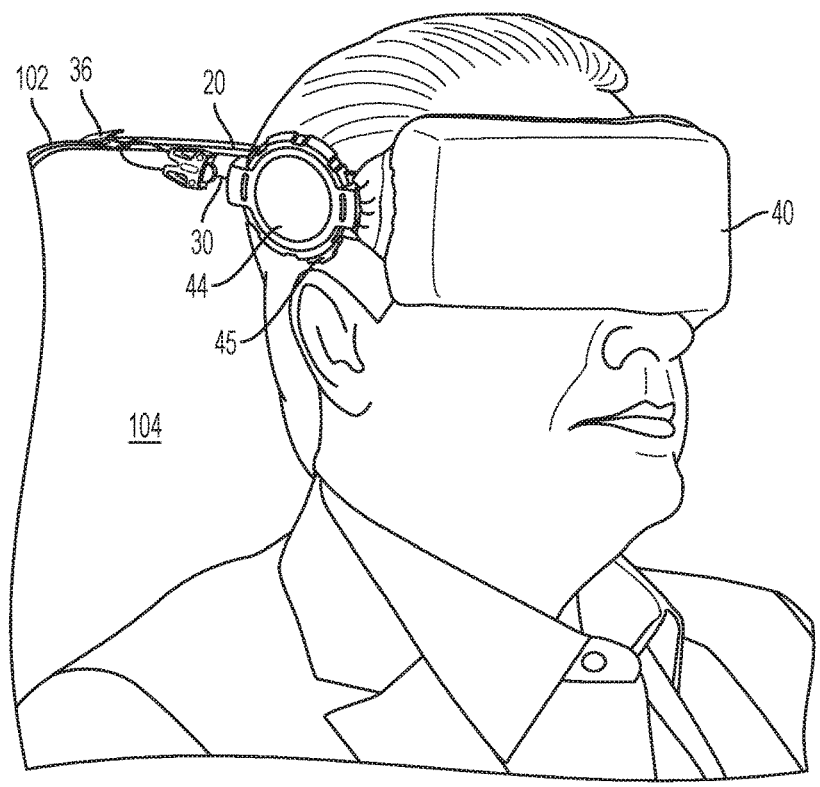
FIG. 18 shows an embodiment of a head support installed on a seat and a person using the apparatus adjusted to contact the forehead.

FIG. 18 shows an embodiment of a head support 10 installed on a seat back 100 and a person using the apparatus adjusted to contact the forehead. In FIG. 18, seat strap 20 is arranged to pass near the top 102 at the back side of seat back 106. Clip 36 on the end of support strap 30 may be seen. Head support 10 provides sufficient tension to maintain the person in an upright neutral position.

Figure 19:
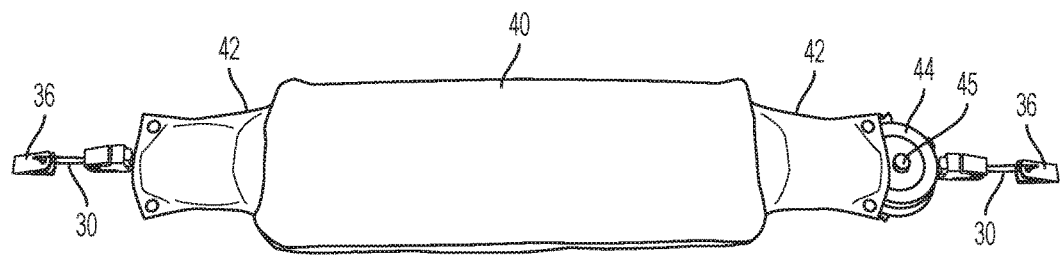
FIG. 19 shows an embodiment of a sling portion of a head support, the sling portion having spring powered reels within the ends of the sling.

FIG. 19 shows an embodiment of a sling portion 40 of a head support 10, the sling portion 40 having spring powered reels 44 within the appendages 42 at the ends 41 of the sling 40. In FIG. 19, at the right end of sling 30, appendage 42 is partially opened to show spring powered reel 44 located inside. Button 45 on spring powered reel 45 is pressed to unlock spring powered reel 45 and allow support strap 30 to be adjusted. Button 45 is accessible through the covering of appendage 42 when appendage 42 fully encloses spring powered reel 44.

Figure 20:
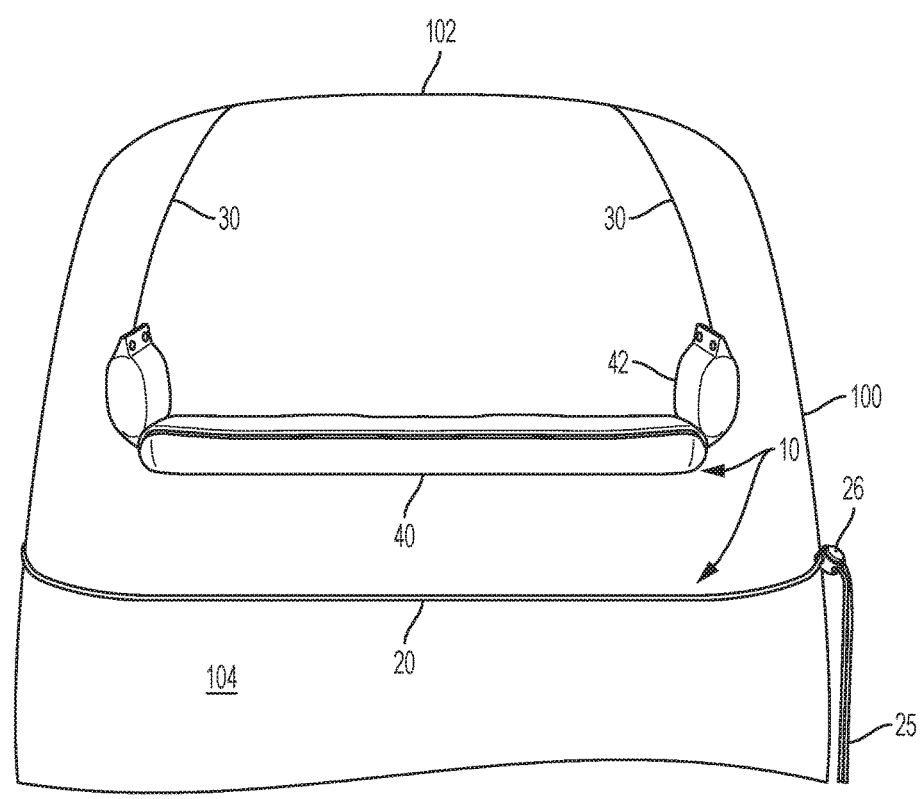
FIG. 20 is a front perspective view of an embodiment of a head support installed on a seat back.

FIG. 20 is a front perspective view of an embodiment of a head support 10 installed on a seat back 100. Seat strap 20 passes around seat back 100 and is adjusted and sized to maintain its position by cord lock 26. Sling 40 is presented at the front side 104 of seat back 100. Support straps 30 extend from spring powered reels 44 hidden within appendages 42 at ends 41 of sling 40. Buttons controlling spring powered reels 44 are accessible through the covering of appendages 42. Support straps 30 pass up over the top 102 of seat back 100. On the back side 106 of seat back 100, support straps 30 attached to seat strap 20.

It may be noticed in FIGS. 13, 16, and 20 that sling 40 runs horizontally across the front 104 of seat back 100. This a result of sling 40 in those embodiments comprising foam filling, or padding, of sufficient rigidity to maintain their linear shape when not under load. However, sling 40 in those embodiments is pliable and will conform to a users face. A similar effect may also be seen in FIG. 5, although with less appearance of rigidity. In embodiments, sling 40 may be differently comprised and therefore may not have the same appearance when not in use. For example, some gel cushions may sag under their own weight, etc.

It is to be understood that the embodiments and arrangements set forth herein are not limited in their application to the details of construction and arrangement of the components set forth in the description and illustrated in the drawings. Rather, the description and the drawings provide examples of the embodiments envisioned, but the invention is not limited to the specific embodiments. The embodiments disclosed herein are further capable of other embodiments and of being practiced and carried out in various ways, including various combinations and sub-combinations that may not have been explicitly disclosed. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the invention be regarded as including such equivalent constructions.

I claim:

1. An apparatus for supporting a person's head while the person is seated in a seat having a seat back, the seat back having a back side, a top, and a front side, said apparatus comprising:
    a seat strap configured to form a loop and encircle the seat back of a seat;
    a sling having a first end, a second end, a distal surface, and a proximal surface opposite said distal surface;
    a first spring driven reel enclosed within said first end of said sling;
    a second spring driven reel enclosed within said second end of said sling;
    a first sling strap having a proximal end and a distal end, said proximal end of said first sling strap terminating in said first spring driven reel enclosed within said first end of said sling and said distal end of said first sling strap attaching to said seat strap at the back side of the seat; and
    a second sling strap having a proximal end and a distal end, said proximal end of said second sling strap terminating in said second spring driven reel enclosed within said second end of said sling and said distal end of said second sling strap attaching to said seat strap at the back side of the seat; wherein,
    said first sling strap and said second sling strap being of sufficient lengths to pass over the top of the seat back and hang down at the front side of the seat, suspending said sling at the front side of the seat.

2. The apparatus of claim 1, wherein:
said sling contains padding.

3. The apparatus of claim 1, wherein:
at least one of said distal end of said first sling strap and said distal end of said second sling strap is removably attached to said seat strap.

4. An apparatus for supporting a person's head while the person is seated in a seat having a seat back, the seat back having a back side, a top, and a front side, said apparatus comprising:
    a seat strap configured to form a loop and encircle the seat back of the seat;
    a sling having a first end, a second end, a distal surface, and a proximal surface opposite said distal surface;
    a first spring driven reel attached to said first end of said sling;
    a second spring driven reel attached to said second end of said sling;
    a first sling strap having a proximal end and a distal end, said proximal end of said first sling strap terminating in said first spring driven reel attached to said first end of said sling and said distal end of said first sling strap attaching to said seat strap at the back side of the seat; and
    a second sling strap having a proximal end and a distal end, said proximal end of said second sling strap terminating in said second spring driven reel attached to said second end of said sling and said distal end of said second sling strap attaching to said seat strap at the back side of the seat; wherein,
    said first sling strap and said second sling strap being of sufficient lengths to pass over the top of the seat back and hang down at the front side of the seat, suspending said sling at the front side of the seat.

5. The apparatus of claim 4, wherein:
said sling contains padding.

6. The apparatus of claim 4, wherein:
at least one of said distal end of said first sling strap and said distal end of said second sling strap is removably attached to said seat strap.

* * * * *